United States Patent

[11] 3,633,936

[72] Inventor Roy L. Huber
 P.O. Box 96, Garden City, Mich. 48135
[21] Appl. No. 78,083
[22] Filed Oct. 5, 1970
[45] Patented Jan. 11, 1972

[54] AUTOMATICALLY DEPLOYED OCCUPANT RESTRAINT SYSTEM
 25 Claims, 27 Drawing Figs.
[52] U.S. Cl. ................................................ 280/150 B
[51] Int. Cl. ................................................. B60r 21/10
[50] Field of Search ................................ 280/150 B,
 150 AB, 150 R; 296/84 K; 180/82

[56] References Cited
 UNITED STATES PATENTS

| | | | |
|---|---|---|---|
| 2,586,063 | 2/1952 | Kurtz | 280/150 B |
| 2,661,221 | 12/1953 | Lockwood | 280/150 B |
| 2,695,792 | 11/1954 | Rumsey | 280/150 B |
| 3,105,702 | 10/1963 | Larson | 280/150 B |
| 3,494,633 | 2/1970 | Malloy | 280/150 B |
| 3,525,535 | 8/1970 | Kobori | 280/150 B |
| 3,573,885 | 4/1971 | Brawn et al. | 179/18 |

FOREIGN PATENTS

| 264,159 | 12/1964 | Australia | 280/150 B |
|---|---|---|---|

*Primary Examiner*—Benjamin Hersh
*Assistant Examiner*—Robert R. Song
*Attorney*—Cullen, Settle, Sloman & Cantor ABSTRACT: A restraining system of the passive or nondependent type for passenger vehicles such as cars to protect the occupants of the car against injury or death in the case of sudden deceleration of the vehicle caused by an impact and which comprises a flexible blanket or barrier extending across the seats of the car from side-to-side each of which is automatically extended due to an impact deceleration of the vehicle and is pressed against all occupants of each respective seat with a force extending from approximately the shoulder portion of the human body downwardly over the hip and thigh portion to completely extend over the upper and lower torso of the human body and restrain the torso of the human body from being propelled forwardly or towards the side depending on the direction of impact force on the vehicle. The restraining barrier or blanket for the front seat of the vehicle is normally retained in a folded or stored position conveniently forming a padded portion of the dashboard of the vehicle and thus is normally indiscernable; the restraining barrier or blanket for the passenger or rear compartment of the vehicle is normally stored in the back of the front seat of the passenger vehicle; the sides of the restraining blanket or barrier are provided with reinforcing members which have guide means supported in guides disposed along the inner body panel of the vehicle such as to guide the barrier upon expansion along a prescribed path; the restraining barrier is extended by means of actuators concealed in the vehicle which are connected by tension members to the reinforced sides of the restraining barrier; the actuators are automatically operated by means of an impact sensing device to instantly deploy the restraining barriers out of the stored position within fractions of a second.

AUTOMATICALLY DEPLOYED OCCUPANT RESTRAINT SYSTEM

BACKGROUND AND SUMMARY OF THE INVENTION

The present invention relates to vehicle safety devices and more in particular to an occupant restrain system adapted to restrain the occupant from being propelled forwardly or sideways due to a sudden deceleration of the vehicle or an impact force of a magnitude sufficient to throw the vehicle from its normal path of travel.

It is well known that the automobile continues to be a leading cause of serious injuries and premature death of many thousands of human beings each year.

Accordingly, throughout the automobile industry and independent research and development centers, much consideration has been given over the past decade to equip automobiles with occupant restraining devices of which, however, at the present, only the common seat or lap belt (in instances coupled with a shoulder harness) has matured in practical application, and recently has become a required standard equipment for all new passenger automobiles.

It is a well-known fact, that only a relatively small percentage of occupants of a passenger vehicle apply the safety belt when travelling in the vehicle, which is primarily due to the dislike of most people to be "chained" onto the seat while riding in a vehicle and thus restricting their freedom of movement in addition to the thought of being trapped by the safety belts in case of an accident. Another partial reason of most people for not wearing seat belts while travelling in a vehicle, is due to the relative nuisance connected with applying the seat belt, and shoulder harness if such is supplied in the first place.

Thus, on an overall basis, the present standard equipment of safety belts in vehicles is, to a larger percentage, relatively ineffective as a safety measure due to the simple reason that the safety belts are not being worn. Another, more serious disadvantage of present day safety belts for vehicles is, that in case of an accident, due to the force of an impact the lap belt, if no shoulder harness is provided in addition thereto, is not sufficient to restrain the upper torso of the occupant wearing the lap belt against propelling forwardly upon sudden deceleration of the vehicle, causing the body to "jackknife" about the location of the lap belt around the body, which, in many instances, has resulted in serious internal injury to the occupant of the vehicle. Additionally, due to the relative inflexibility of the safety belts, the safety belts at a certain magnitude of impact force "cut" into the body of the occupant with a similar result of internal injury.

An even more serious disadvantage of presently employed safety belts for a vehicle is, that the belts are not sufficient to restrain the occupant against sideways propelling forces, such as occur by impact against the side of a vehicle. Thus, in this instance, the lap belts, particularly if no shoulder harness is worn, provide practically no restraining protection against side impact forces.

Thus, in view of the unsatisfactory safety aspect of presently employed automobile safety devices, much consideration has been given in the past decade towards an effective automatic passive, that is nondependent, restraining system for occupants of automobiles which does not require any action on the part of the occupant of the vehicle and which, during normal travel of the vehicle, is in no way connected with the occupant of the vehicle, so that his free movement is in no way restricted.

One such highly publicized passive retraining system incorporates an inflatable bag structure, disposed in front of the seats of the vehicle and normally hidden in a stored capacity, but which is automatically inflated upon impact or sudden deceleration of the vehicle and extended towards the occupants of the seats in the vehicle to restrain the occupants from being propelled forwardly in the direction of former travel of the vehicle.

The inflatable bag structure presently under development has a serious disadvantage, in that, when expanded, it completely blocks the view of the operator of the vehicle and, furthermore, provides only a single transient capability in that the bag deflates to absorb one shock load on the occupant in the seat and is, as presently known, relatively ineffective against side impact forces.

In order to provide an effective restrain system for occupants of a vehicle, the following considerations must be taken into account: the primary "killing" implements embodied in a vehicle in order of their damaging effect, regardless of the seating arrangements of the occupants are (1) the windshield, (2) the steering assembly, and (3) the instrument panel, the simple conclusion being that the occupants of the vehicle at a sudden deceleration of the vehicle overtake the forward boundary of the vehicle compartments. The most serious fact is that the upper torso of the occupant, which contains the most vulnerable parts of the human body, will be propelled upon the windshield, steering assembly or instrument panel in the case of a frontal impact force.

Thus, the principle design criteria applicable to all occupant restrain system must be to decelerate all vehicle occupants in response to sudden deceleration of the vehicle (such as in a head-on collision). However, to be operable with a maximum degree of effectiveness, the occupant restrain system must also decelerate all vehicle occupants in response to all other directional impact forces such as caused by side, rear, top or other collisions and must as well be effective in complex and multiple event collisions. This implies, of course, that force must be applied to the occupant in multiple directions in response to various propelling forces.

In addition to the above an effective occupant restrain system must have the following qualities and capabilities: the restrain system (1) must not impair the drivers vision and thus interfere with vehicle control, (2) must provide crash survival in head-on collisions at speeds above 40 miles per hour, (3) must conveniently and quickly accommodate post-crash egress from the vehicle (this is of particular importance in instances where the crashed or impacted vehicle burst into flames), (4) must minimize changes in vehicle design and styling, (5) must provide maximum reliability under substantially all circumstances of collisions or crashes, and (6) must be automatically deployable so as not to rely on actions by the occupant of the vehicle which, as is known, is the main reason for the ineffectiveness of present day restrain systems.

Thus, the reliability of any such safety system for vehicle occupants must not depend on premeditated cooperation by the occupant, in other words, a reliable system must be automatically deployable and all such systems preferably must include the following features: (1) a crash sensor or incipient predictor to actuate the deployable system; (2) an occupant to vehicle interface, preferably flexible and relatively soft, such as pads, pillows or the like, but which has sufficient inherent restraining capabilities, (3) a sound structural path from the occupant restraining reaction all the way to the vehicle decelerator or obstruction; (4) an energy source for deployment of the system and (5) a repeatable restraint geometry and deployable kinematic.

Accordingly, the present improved automatic deployed occupant restrain system is designed to function to (1) reliably sustain the upper torso load and the lower lap section load due to deceleration; (2) distribute loads on the occupant consistent with physiological knowledge; (3) fold out of the way in consideration of the vehicle aesthetic and structural requirements; (4) reliably distribute the resultant loads from the occupant onto the restraint member and (5) have a minimum amount of mass and thus low inertia.

A primary object of the present invention is to automatically respond to any significant vehicle deceleration, such as would result from a head-on impact, by deploying a full coverage restraint device to apply a force to all occupants before they have moved relative to the vehicle significantly.

Another object of the present invention is to apply the relatively large restraining forces on those areas of the occupants which can best endure these forces.

Another object of the present invention is to automatically deploy the restraint system in a rollover type accident in which the restraint system functions to secure the occupants to the seats and aft of the restraint device.

Another object of the present invention is to preclude concentration of the required restraining forces by means of "hardware" and to preclude concentrated impact against the occupants by the restraining member during the automatic deployment function.

Another object of the present invention is to provide restraining forces for multiple event collisions embodied in the system and which does not impede driver control and vision so that the restraint system can remain effective and in its active position until the occupant elects to remove the device.

Another object of the present invention is to minimize negative side effects which can be anticipated from the rapid release of energy which is fundamental to an extremely rapid movement required of an adequate restraint device. (Such as noise.)

A further object of the present invention is to provide means for energy dissipation in response to very high energy head-on impacts in excess of 45 miles per hour vehicle speed.

Still another object of the present invention is to automatically deploy the present improved restraint device to intercept all nominally positioned occupants within 0.040 seconds of a head-on collision at 30 miles per hour.

A still further object of the present invention is to make maximum use of the existing vehicle body structure and features to be uniquely considerate of interior package details with regard to packaging of the device and the structural path of the dynamically resultant occupant loads which must eventually terminate at the immovable object which is the source of the deceleration.

Still another object of the present invention is to provide for ease of maintenance and inspection to assure confidence of the reliability and readiness of the crash survival capability which is the primary purpose of the present improved automatically deployed occupant restraint system.

In more general terms, the present improved, automatically deployed, occupant restraint system is composed of a blanket or barrier type restraining element, such as a flexible net extending from door to door of each seating compartment; tension members are attached to all the reinforced corners of the blanket or net to carry the dynamic loads to suitably anchored actuator devices which are capable of quickly deploying the blanket or net from the indiscernible stored position into functional position; the actuator devices are triggered by crash or impact sensors to instantly bring the system into function.

The blanket elements or barriers, i.e., hereafter referred to as nets, are made of high strength tensile fibers. At the upper extremity a higher strength, reinforced band assures structural integrity of the net and focuses dynamic reaction loads on those parts of the occupant's body which are best able to sustain the forces required. At the lower extremity and along the lateral boundaries, similar higher strength bands are provided for assuring structural integrity at the interface between the fabric and the hardware.

The front seat restraining net is provided with a window to enable the extension of the net over the steering wheel and over the arms of the driver so as not to interrupt continuous control by the driver of the vehicle.

High strength tensile members are attached to the net which provide both, the acceleration to deploy the nets and the structural path to decelerate the occupants and they pass over suitable anchor points which are secured to the vehicle body at suitable strong locations aft of the occupants.

The front seat restraining net is stowed across the instrument panel or dashboard and appears as conventional trim. Guides attached to the upper corners of the net direct the tensile members during the deployment function. Lower end guides are under the door trim panels and assure that the lower periphery (which is essentially a manifold lap belt) is deployed over the thigh-pelvic area of the torso. Around the steering wheel assembly the lower reinforced band loops under the steering column.

The rear seat restraining net is stowed either in a pouch across the seat back of a bench type front seat or, respectively, in a lower pouch in the seat support of a split type front seat. In a typical rear seat application, only the upper anchors need to be deployed, whereas the lower anchors are permanently secured to the body structure. This again provides an unobtrusive, practically indiscernable, occupant restraint device which, with the exception of short lengths of webbing under the front seat, gives the appearance that the vehicle is equipped with no restraint devices at all.

During deployment of the rear seat net the path of the upper boundary of the net is controlled by guides confined between the trim panel and the door structure.

A deployment stroke of about 1.5 feet is provided by an explosive gas generating charge in an actuator device similar to a harpoon gun. A pair of these explosive charge actuator devices are provided in a typical four door sedan vehicle, both of which are located above the rear wheel wells and extend to the rear bumper. The explosive charges are detonated by means of an electrical signal received from a crash sensor suitably located within the vehicle. To release the deployed net, disconnect pull rings are provided at convenient anchor points at each lateral extremity of the net.

The present invention will be best understood by reference to the following detailed description in connection with the appended drawings.

BRIEF DESCRIPTION OF THE DRAWINGS

The accompanying drawings illustrate in detail several preferred structural embodiments of the present improved automatic deployed restraint system in which.

DESCRIPTION OF THE PREFERRED EMBODIMENTS

Figure 16:
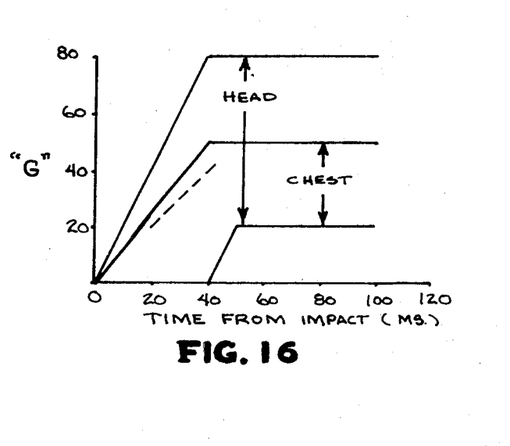
FIG. 16 is a chart plotting the resultant deceleration acting on the occupant as a function of "time from impact."

For better understanding of the forces involved in the instance of a vehicle deceleration vs. occupant acceleration situation, such as upon frontal impact of the vehicle, reference should be had to the chart in FIG. 16 which, graphically illustrates the performance requirement for any effective restraint system at a 45 miles per hour head-on impact.

The time counted from the instant of impact is plotted on the horizontal axis and the resultant "G" magnitude deceleration is plotted on the vertical axis.

The chart indicates that a force in response to impact must be applied to the occupant within 40 milliseconds after instant of impact and that the force must be in proportion to the occupant mass (weight). Thus, the chart indicates that (1) the resultant deceleration of the chest must be above 20 "G" by the 50 millisecond; (2) the resultant deceleration of the head must not exceed 80 "G;" (3) the resultant deceleration of the chest must not exceed 50 "G." The dashed line across the chest portion of the chart indicates the desired onset (initial jerk) rate at 1,000 "G" per second.

The "G" descent ramp and the duration is unspecified because this becomes a function of occupant initial energy content and vehicle crash characteristics, rather than primarily controlled by the restraint system characteristics.

Also to be noted, is that deceleration of the occupant may be allowed to be below 20 "G" if the vehicle deceleration is below 20 "G."

Figure 1:
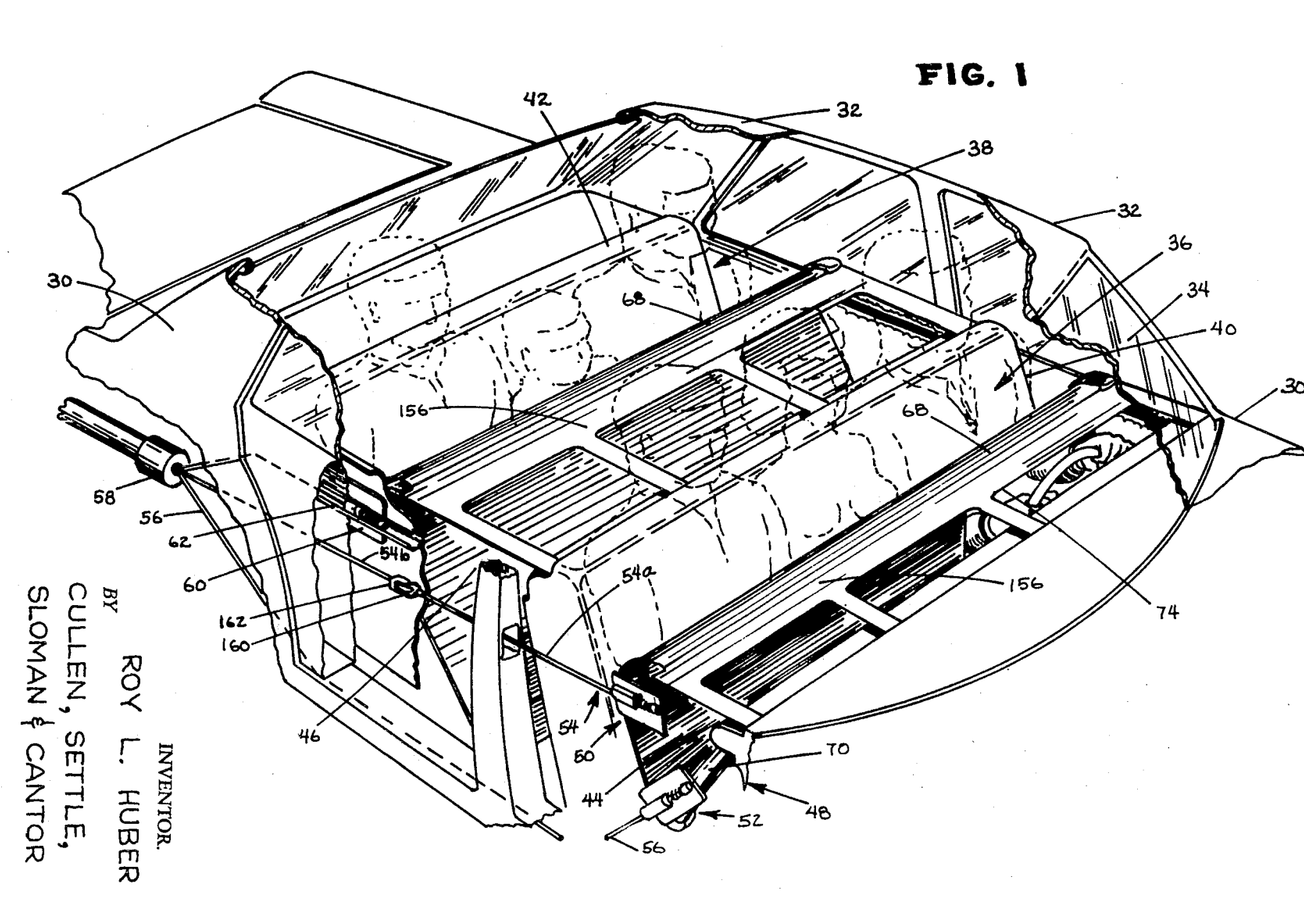
FIG. 1 is a perspective illustration of the present improved restraint system installed in a vehicle, parts of the vehicle being cut away for clarity.

With reference now to FIG. 1, the schematically indicated passenger vehicle body 30 has a roof 32 and a windshield 34. The vehicle body encloses a front or drivers compartment 36 and a rear or passenger compartment 38. Customarily, both compartments are provided with seats 40 and 42, respectively, for the accommodation of a number of persons usually not exceeding three for each seat.

In the illustration shown in FIG. 1, the present improved restraint system is shown in the applied position after an impact and comprises an automatically deployable front restraint barrier, in the form of a fabric 44, and a likewise automatically deployable rear barrier 46.

The front seat barrier 44, which generally may be termed a net, is normally disposed in the body of the vehicle, folded across the "eye brow" of the dashboard 48, and extends across the vehicle from one side to the other side. Similarly, the rear seat barrier 46, likewise, constructed as a fabric or resembling a net, normally is concealed, folded within the back of the front seat so as to be normally not showing.

The reinforced side margins of the front seat restraint net are connected by means of guide follower assemblies 50 and 52 at the upper and lower ends, respectively, to the upper and lower pull cables 54 and 56 which extend lengthwise through the vehicle body frame and rearwardly for connection to an actuator 58 disposed in the rear end of the vehicle. It will be understood that a similar arrangement is provided at the other side of the front seat deploy net 44.

The rear seat deploy net permanently secured at the lower end to the vehicle body and at the upper end, by means of a similar fitting 60, to a pull cable 62 which is likewise attached to the same actuator 58. Here, likewise, a similar arrangement is provided for the rear seat deploy net 46 at the other side so that each deploy net is connected for extension to two oppositely disposed actuators 58.

In the illustration in FIG. 1 the front and rear deploy nets 44 and 46 are shown in applied restraining position immediately after impact or sudden deceleration of the vehicle 30 and it will be noted, that the upper margins of the deploy nets extend across the chest portions of the occupants in the seats 40 and 42, and the lower margins of the deploy nets extend across the lap portions of the occupants. The deploy nets, when extended in restraining position as shown, are of sufficient tensile strength and extend sufficient force against the bodies of the occupants in the respective seats, to retain the occupants in the seat and prevent them from being propelled forwardly and upwardly upon sudden deceleration of the vehicle.

Figure 2:
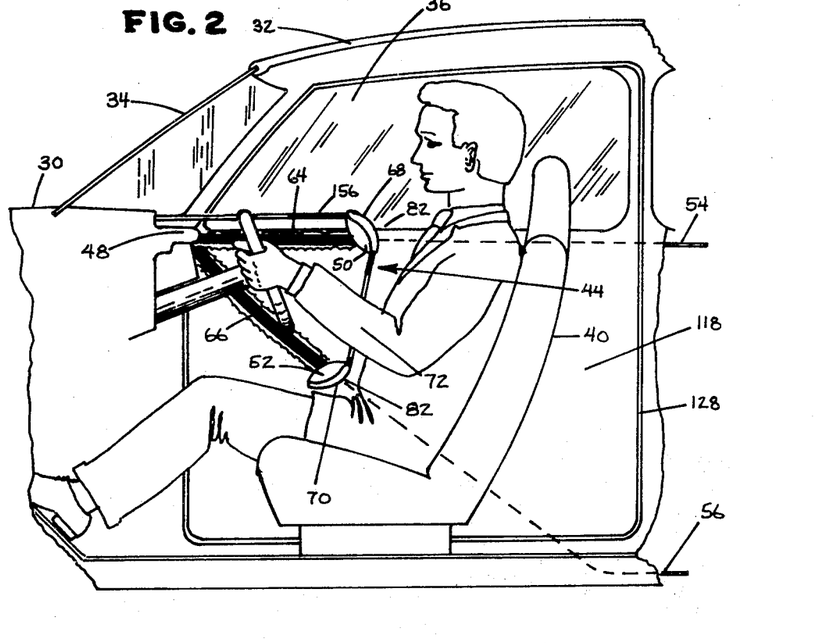
FIG. 2 is a schematic side elevation of the driver's section of the vehicle, illustrating the deployment function of the present system around the steering column.
Figure 8:
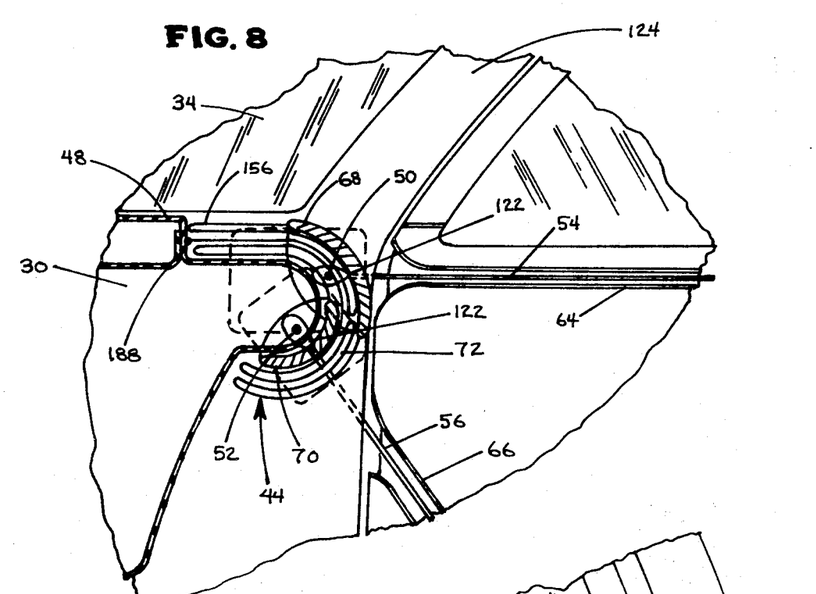
FIG. 8 is a fragmentary side view of the front seat compartment illustrating the barrier element storage within the dashboard, partly sectioned for illustration.

With further reference to FIGS. 2, 3, 23 and 24, in FIG. 2 the geometry for the pull cable arrangement to deploy the net 44 is schematically illustrated. It will be seen that the upper portion of the deploy net 44 is connected by an upper anchor point or guide fitting 50 to the upper pull cable 54 which, in this instance, during deployment of the net pulls the upper guide fitting 50 along appropriate guide means 64 provided in the body of the vehicle. The upper cable 54 extends rearwardly through a body section of the vehicle, over appropriate anchors, guides or the like for connection to the actuator 58. Similarly, the lower guide fitting 52 is pulled by means of the cable 56 along an appropriate downwardly extending guideway 66 provided in the side of the vehicle body, FIG. 8.

Figure 3:
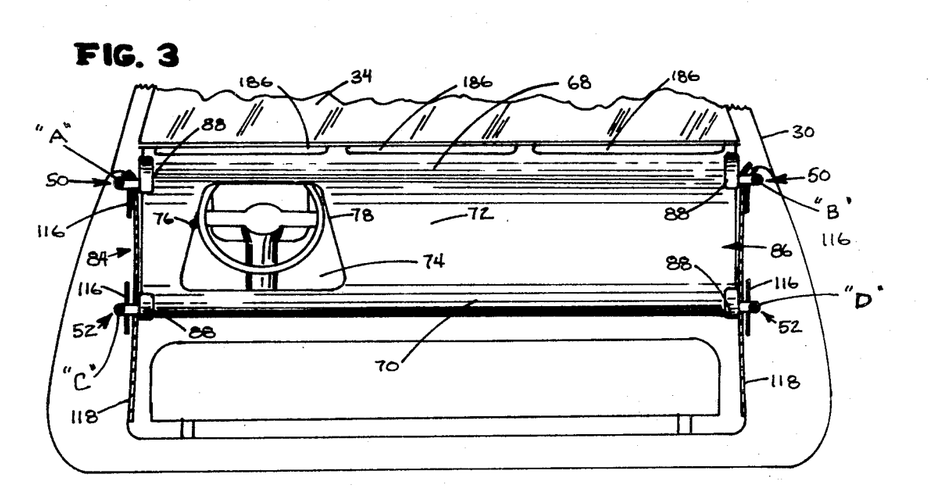
FIG. 3 is a rear elevational view of the deployed barrier of the restraint system for the front seat of the vehicle, as looking forwardly.

With additional reference to FIG. 3, which schematically illustrates the deployed net 44 in expanded position across the front seat of the vehicle and as seen from the rear of the vehicle, the deploy net has a transverse upper high strength shoulder zone 68 extending crosswise from door to door of the vehicle and adapted for abutment against the chest or upper torso of the body of the occupant or occupants. Similarly, the deploy net 44 provides a lower transverse high strength lap zone 70 likewise extending across the compartment of the vehicle from door to door adapted for abutment against the lap portion or lower torso of the body of the occupant, or occupants, when extended in restraining position.

The upper and lower high strength zones 68 and 70 of the deploy net 40 are separated by an intermediate, force distribution section 72, which is relatively flexible for folding of the deploy net 44 in the stored position across the dashboard of the vehicle.

The front end deploy net 44 is additionally provided at the operators side of the net with an access opening or window 74, FIG. 3 for disposal around the steering column of the vehicle and extension over the steering wheel when the net is applied in restraining position, so as to permit the operator of the vehicle to maintain control of the vehicle. The window or access opening 74 for the steering wheel assembly is separated from the medium strength force distribution zone 72 by means of opposite high strength tension members 76 and 78, respectively, connected between the upper shoulder zone 68 and the lower lap zone 70.

With further particular reference to FIGS. 4 through 12, although the term "net" is used herein to describe the flexible barrier element, it will be understood that the barrier type load distributing restraint element is more sophisticated than a simple net, and can be termed more technically a membrane or diaphragm. However the term "net" due to the general structure of the element as will be described, seems to convey the general idea of a member which is as taught as practical when deployed particularly around the two main restraint portions by means of the upper shoulder zone 68 and lower lap zone 70 which in combination with high transverse tension, minimizes deflection of the center section.

The deploy or restraint net 44, is designed to specifically apply large restraining forces to the lower and upper torso of the occupant, that is, the lap portion and the chest portion of the human body, which are two zones which can best sustain the large required restraining forces.

Figure 5:
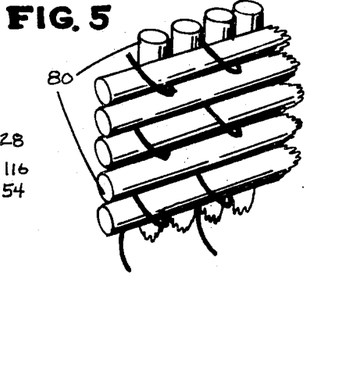
FIG. 5 is a fragmentary perspective view of the fiber structure of the high tension fabric of which the barrier element is constructed.

The intermediate force distribution section 72, which properly can be called a membrane and which in inoperative position of the net is folded accordion style as are the high strength upper and lower zones 68 and 70, comprises a fabric of interwoven high strength tensile fibers 80 as shown in FIG. 5.

Figure 4:
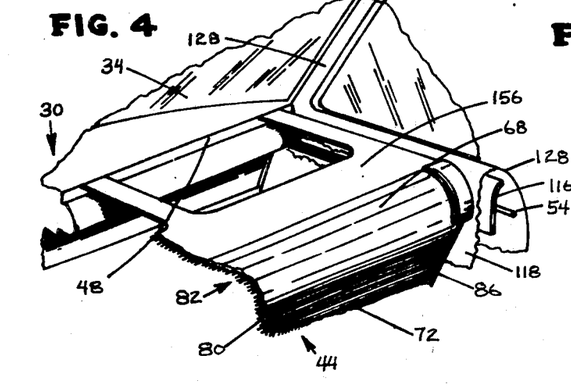
FIG. 4 is a fragmentary perspective illustration of the right-hand portion of the expanded barrier element of the present system.
Figure 6:
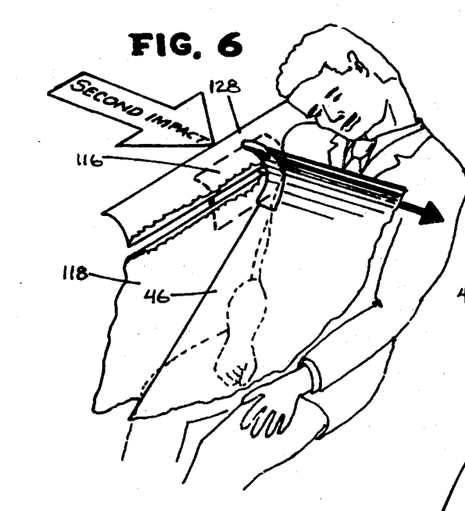
FIG. 6 is a fragmentary perspective view of the right rear passenger reacting to side impact and corresponding to FIG. 1, as viewed looking rearwardly from the driver's side.

The intermediate membrane portion 72 of the net is connected at its upper and lower extremities to a plurality of horizontal tension members 82 which are oriented such in parallel relationship as to assume a curvilinear shape in cross-sectional direction of the net, as seen in FIGS. 4 and 6. The horizontal tension fibers 82 provide the aforementioned upper and lower high strength shoulder and lap zones 68 and 70 respectively, which, when the net is activated, extend across the torsos of all the occupants of the respective seat to securely retain the occupants in the seat.

The high strength horizontal tension members 82 of the shoulder and lap zones 68 and 70, respectively, in a particular example, may comprise high yield strength-to-weight ratio material (such as music wire for example of about 0.020 inch diameter and disposed on a pitch of about 20 per inch). Obviously, alternative high tensile fibers can be woven as the fabric occupant barrier.

Vertically oriented at each lateral periphery of the net, are similarly reinforced high strength zones 84 and 86, respectively, connected to the membrane 72 and the respective outer ends of the upper high strength shoulder zone 68 and the lower high strength zone 70 of the net.

As more particularly shown in FIGS. 9–13, the side or lateral high strength zones 84 and 86 include vertical tension members connected to the respective upper or lower pull cables 54 or 56 by means of a fitting assembly 88. Such assembly at both the upper and lower ends at the barrier may be connected to the cables by a hitch pin 90 which is attached to a release member 92 in the form of a ring. Thus, by pulling the release member 92 the hitch pin will be pulled out of the fitting 88 to thereby release the upper and lower corners of the net from the cables to permit egress of the occupant from the vehicle after the net has been deployed and served its function.

As particularly illustrated in FIGS. 7 to 10, the front seat restraint net 44 is normally stored within or along the dashboard 48 of the vehicle so as to form an integral part therewith in an inactive position. As particularly seen in FIGS. 8 and 9, the intermediate membrane portion 72 of the net is folded within and between the cross-sectionally curvilinear upper, high strength zone or band 68 and the lower high strength zone or band 70.

Figures 10, 11, 12:
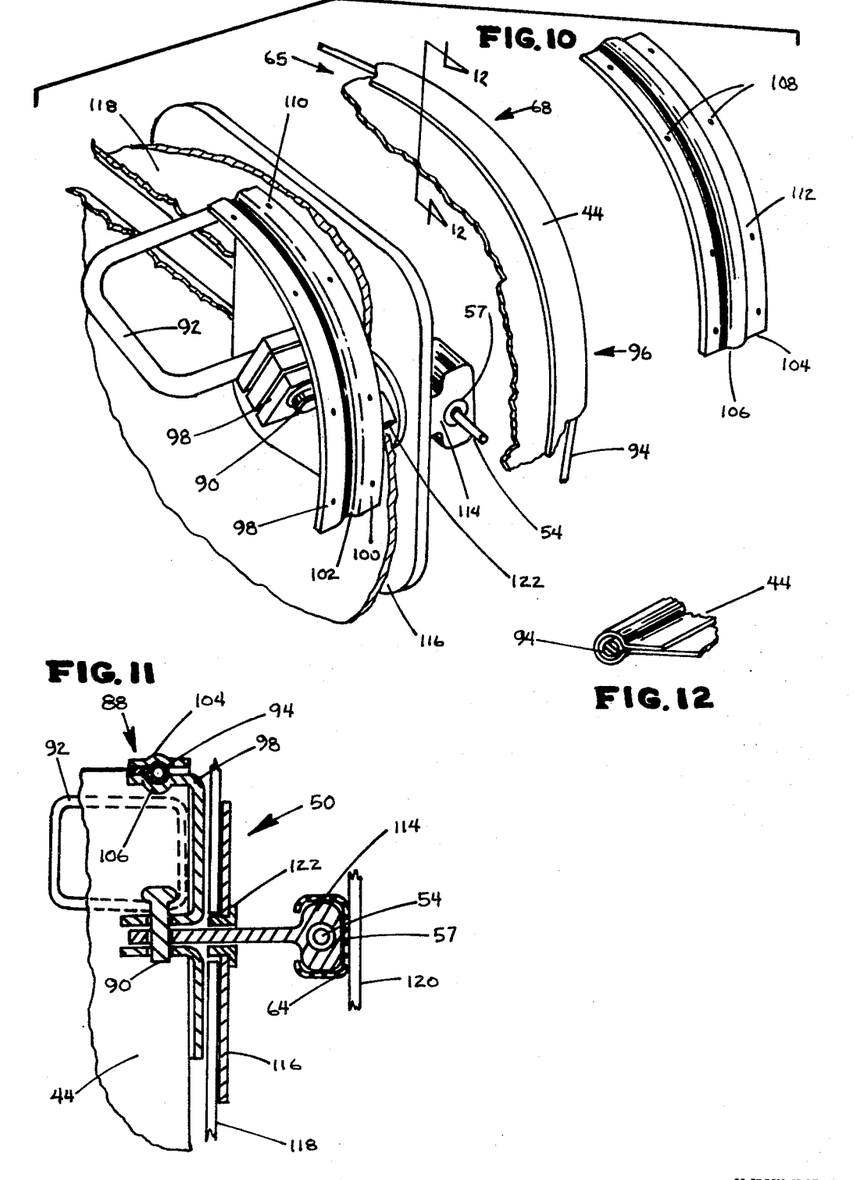
FIG. 10 is a perspective view of the anchor structure of the barrier element and cooperating guide means for securement to the door or body panel of the vehicle.
FIG. 11 is a fragmentary section through the right door of the front seat compartment illustrating the anchorage and guide means of the barrier element through the door of the vehicle, viewed as looking forwardly.
FIG. 12 is a fragmentary section taken in the direction of arrows 12—12 of FIG. 10.

The outer upper and lower lateral corners of the net are connected to respective guide assemblies or end fittings 50 and 52 FIG. 1 by the following means illustrated in detail in FIGS. 10 and 11.

For example, the upper right hand corner of the net 44 at the lateral outer edge of the high strength zone or band 68 and in lateral direction thereof, is provided with a curved reinforcing rod 94 corresponding to the cross-sectional curvature of the upper band 68, and which is retained within the net to provide the lateral outer edge with a reinforcement 96. The upper guide assembly 50, in this instance is composed of a support member 98 which has a similar curvilinear shaped upper surface 100 and is provided with a groove 102 to receive the reinforcement 96 of the lateral upper edge of the net 44. Such formation 96 of the net 44 is retained on the support member 98 by means of a curvilinear retainer plate 104 which has a longitudinal groove 106 disposed in opposite position to the groove 102 on the support member 98. Thus, in assembly of the lateral upper edge of the upper high strength zone or band 68 of the net 44 to the guide assembly 50, the reinforcement formation 96 is placed into the groove 102 of the support member 98 and the retainer member 104 is placed on top thereof with the groove 106 extending over the top of the reinforcement 96 and is thereafter suitably fastened to the support member 98 by means of provided fastener apertures 108 in the retainer member 104 and apertures 110 in the support member 98 to receive suitable fasteners such as rivets as seen in FIG. 10.

The support member 98 is attached by means of a pin 114 to a force reaction plate 116 which is disposed between the internal trim panel 118 and a structural panel member 120 of the vehicle body. The pin 114 is slidably supported within a slot defining the upper or lower guide means 64 or 66 respectively, (see FIG. 2). The inner reaction plate 116 through pin 114 is secured to the end of the actuator cable 54, as also seen in FIG. 1, so that upon pulling action on the cable 54, by means of operation of the actuator 58, the cables will draw the upper outer edges of the net from their stowed position along the guide means 64 by means of the follower pin 114 and reaction plate 116 into restraining position approximate to the bodies of the occupants in the respective seat.

Figure 9:
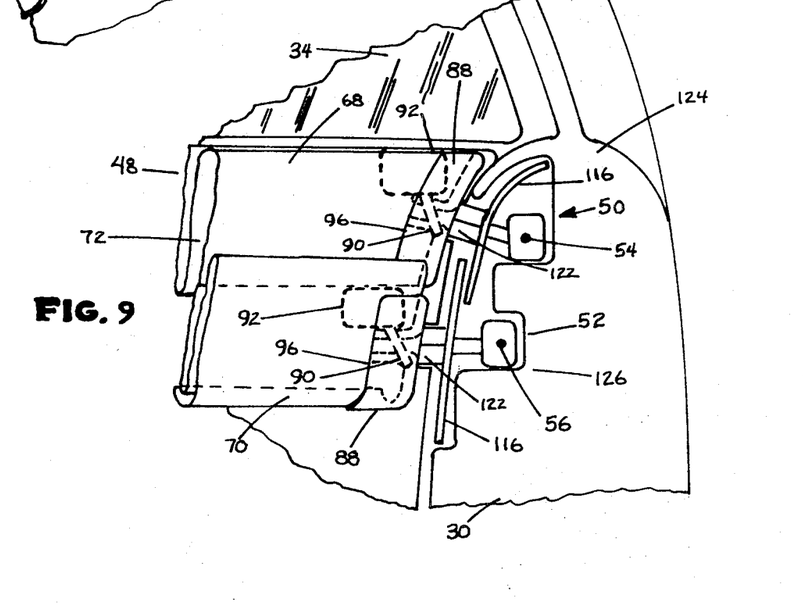
FIG. 9 is an enlarged fragmentary view of the end fitting anchorage construction of the barrier element as viewed looking forwardly from the right front seat.

It will be understood that opposite upper and lower edges of the front seat net 44 are each provided with similar type end fittings 50 and 52 as just described in connection with FIGS. 9, 10 and 11, for deployment of the restraint net along predetermined guide ways within the inner panel structure of the vehicle body as indicated in FIGS. 2, and 3 disposed at desired locations depending primarily on the internal structure of the vehicle body. The rear restraint net 46 (FIG. 1) is similar to end fittings 50 and 52 (as shown in FIG. 1) for guiding movement along a predescribed path defined by suitable guideways within the vehicle body structure. However, the lower end of the rear seat restraint net 46 is preferably stationarily secured to the body structure of the vehicle forwardly of the occupants of the rear seat.

The opposite lower and upper end and guide fittings 50 and 52 or 60 of the restraint nets 44 or 46, respectively, effectively carry the occupant reaction loads from the restraint net, after the net has been deployed, to the deployment harness defined by the actuator cables 54, 56 or 62, respectively.

The end fittings 50, 52 and 60, respectively, illustrated in detail FIGS. 8 through 14 guide the restraint nets 44 and 46 in deploying position along a prescribed path and further function to focus distributed elemental fiber tension loads from the net into a manageable connection at a "point" interface. The end fittings further, due to their structure, form and maintain the upper and lower high strength zones 68 and 70 of the restraint net, in a curved form, when seen in cross section to effectively distribute occupant reaction loads at the upper and lower extremities of the restraint net.

The end fittings are provided with followers such as the pin 114 to move along predesigned paths in the interior side trim panels of the vehicle which define the deployment kinematic function in a controlled and reproducable manner. The end fittings further, due to the provision of the relatively large reaction plate 116 inside of the trim panel, assure a distribution of side impact occupant reaction load against the side trim panels and which in the deployment stroke may be pulled inward a few inches, separating the plates from the side panel structure. Concentric with and mounted on the pin 114 a plow shaped cutter 122 as shown in FIGS. 8, 9, 10 and 11 is provided to cut a path through the trim panel. (The trim panel 118 obviously may be partially cut or perforated along the described path.)

The tensile deployment harness defined by the actuator cables 54, 56 and 62 (FIG. 1) carry the occupant reaction loads, brought to focus at the end fittings, to the deployed anchorage points A, B, C and D (FIG. 3) of the net to the vehicle structure.

Additionally, the actuator cable, which are high tensile members, transmit the accelerating forces from the deployment actuators 58 to the end fittings of the restraint nets.

There may obviously be many ways to guide the high tension actuator cables 54 and 56 or 62, respectively, along the vehicle body rearwardly to the actuators 58 along a prescribed path. Such as guiding the upper cable along the upper longitudinal roof support and the lower cable along the lower rocker beam of the vehicle as schematically indicated in FIG. 2. A preferred form of cable disposal is, for example, illustrated in FIG. 1, in which body upper and lower high tension pull cables 54 and 56 for the front seat restraint net and upper actuator cables 62 for the rear seat restraint net are guided along and through the door panel structure of the vehicle at both rear and front.

With particular reference to FIGS. 17 through 20, an exemplary device to accommodate normal door operation, compatible with a ready tensile path for deployment, is illustrated.

Figure 20:
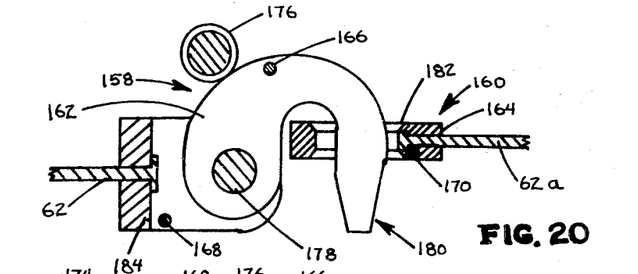
FIG. 20 is a fragmentary section taken in the direction of arrows 20—20 of FIG. 19.

The cable or tensile member 62 is appropriately secured to the hook assembly 158 by being attached to the "U" bracket 184, FIG. 20. The hook 162 is pivotally mounted in the bracket 184 with a pin axle 178. The hook assembly is secured in proper registration with the door swing by shearable pins 166 and 168, which are permanently attached to the vehicle body inner panel 174, FIG. 19. A roller assembly 176 is secured to the vehicle body subassembly 174 in close proximity to the hook 162, which has a cam following shape to affect a closing action of the hook 162 over the eye 160 from the normal position in FIG. 20 whenever the hook assembly is accelerated rearward by the tensile member 62. FIG. 20 shows the normal relation of hook 162 partly projected into the door mounted eye 160, being in inoperative position, when the door is closed.

Figure 17:
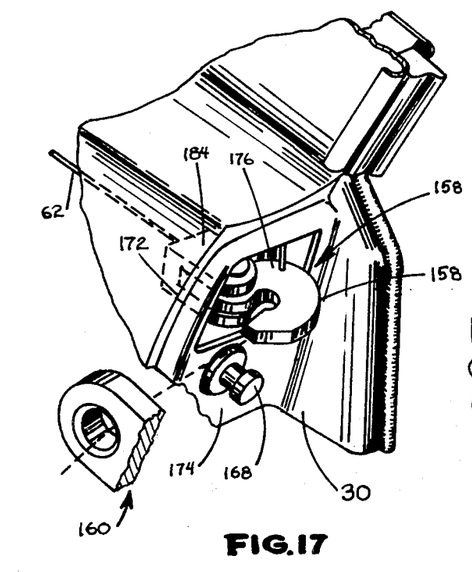
FIG. 17 is a fragmentary perspective view of the right rear door opening corresponding to FIG. 1 as viewed looking rearwardly towards the door opening, illustrating the harness connection before activation, the eye assembly on the door being fragmentarily shown.
Figure 18:
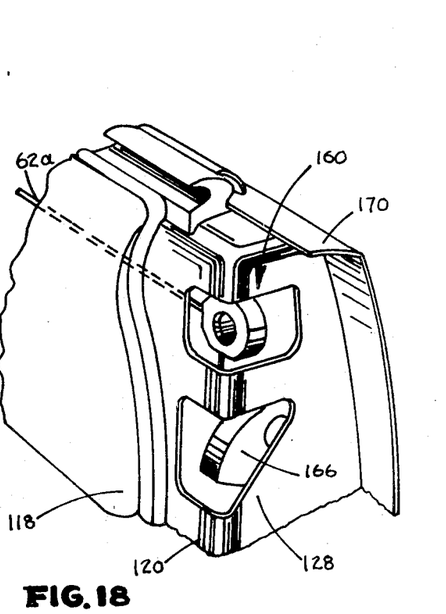
FIG. 18 is a fragmentary perspective view of the rear portion of the right rear door as viewed looking outwardly from the vehicle rear seat, showing the eye assembly as normally poised and is further shown in FIG. 20.
Figure 19:
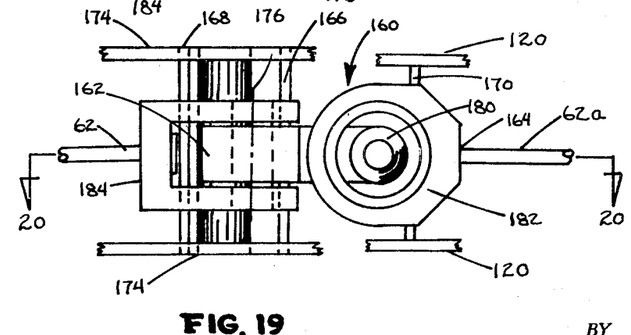
FIG. 19 is a fragmentary side elevational view of the connector assembly with the door shut.

The hook 162 is provided with a "lead-in" taper 180, FIG. 20 to accommodate door alignment tolerance within similar limits as a typical latch assembly (illustrated for reference 166 and 168, FIGS. 17 and 18).

The eye assembly 160 is appropriately secured to form the continuation of the tensile member 62A, a cable section. The eye 164 includes an annular chamfer 182 to facilitate the registration of hook 162 and eye 164 in normal door operation. The eye assembly is normally held in position by pins 170 permanently secured to the door structure 120 which shear when a large accelerating force is applied to the eye 164 by the hook 162 in the deployment routine.

It is intended that the hook and eye assemblies 158, 160, be manufactured as subassemblies and then assembled to the vehicle body and door similarly to the latch-half subassemblies. In fact, it is to be understood that the hook and eye assemblies could obviously be a detail of the same subassemblies of door latch-halves.

This same mechanism is employed at all door joints on the latch side. It is noted that where there is a separate front door assembly and rear door assembly, the front door will include additional cable elements, such as cable assemblies 54A FIGS. 1 and 27, so that the corresponding eye assembly 160 on cable element 54A will interlock with a corresponding pivot hook 158 on the door frame. This hook again will be actuated by an additional cable element 54B nested in the rear door. On the rearward end of the cable element 54B is an eye assembly 160. The latter is normally in registry with a corresponding hook 162 pivoted upon the vehicle body and connected to pull cable 54 and actuator 58.

Figure 27:
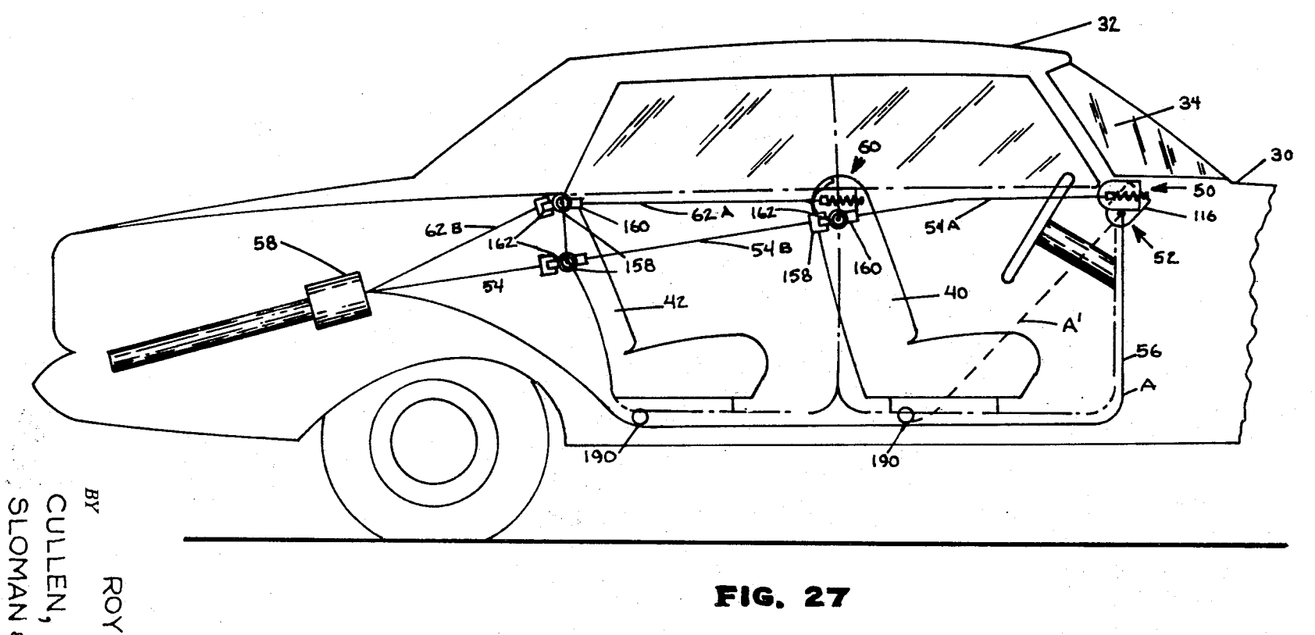
FIG. 27 is a schematic fragmentary side elevation showing one form of cable assembly.

A similar arrangement of cable sections may be provided for the lower cable assembly 56, FIG. 1. A modified cable assembly 56A is shown in FIG. 27 wherein, the lower cable is guided through the vehicle frame below the doors as at 190. When inoperative, the cable assembly 56A is connected to the spring takeup assembly 116 corresponding to FIG. 14, and is positioned as at A, FIG. 27. When actuated the cable element 56A twangs from position A to position A'.

Figure 7:
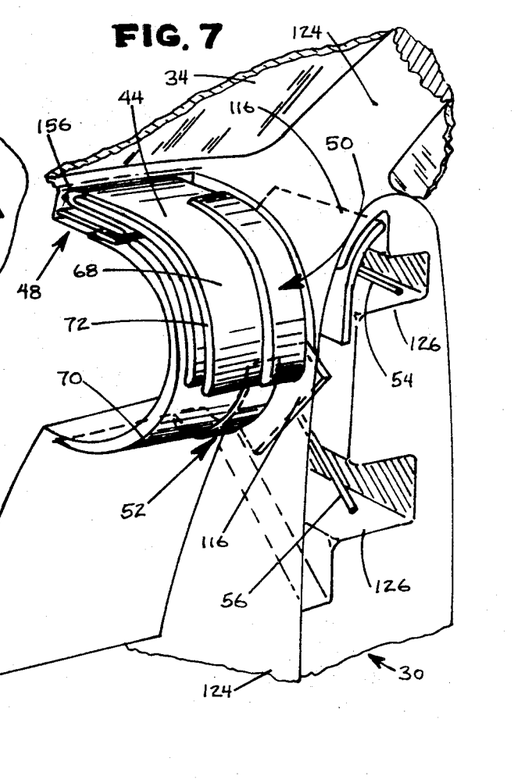
FIG. 7 is a fragmentary perspective detailed view illustrating the indiscernible storage arrangement of the barrier element in the dashboard of the vehicle.

As more particularly illustrated in FIG. 7, the upper high tension pull cable 54, adjacent the end fitting 50 which is attached to the cable at the upper outer corner of the restraint net 44, extends into the front door column or post 124 of the vehicle and into a recess 126 provided therein. The cable 54 is provided with a shock takeup assembly 55, FIG. 14, to accommodate opening and closing movement of the door (shown in FIGS. 8 and 9 and which has been removed from the FIG. 7 for illustrating purposes) which is usually attached to the door post 124 by means of hinges. In FIGS. 10 and 11 (as well as FIG. 13), both upper and lower pull cables 54 and 56 are shown for extension inwardly along the vehicle door between the inner trim panel 118 and the door frame panel 120 for extension rearwardly through the adjacent rear compartment door structure for attachment to the respective actuators 58, as illustrated in FIG. 1.

Figures 13, 14:
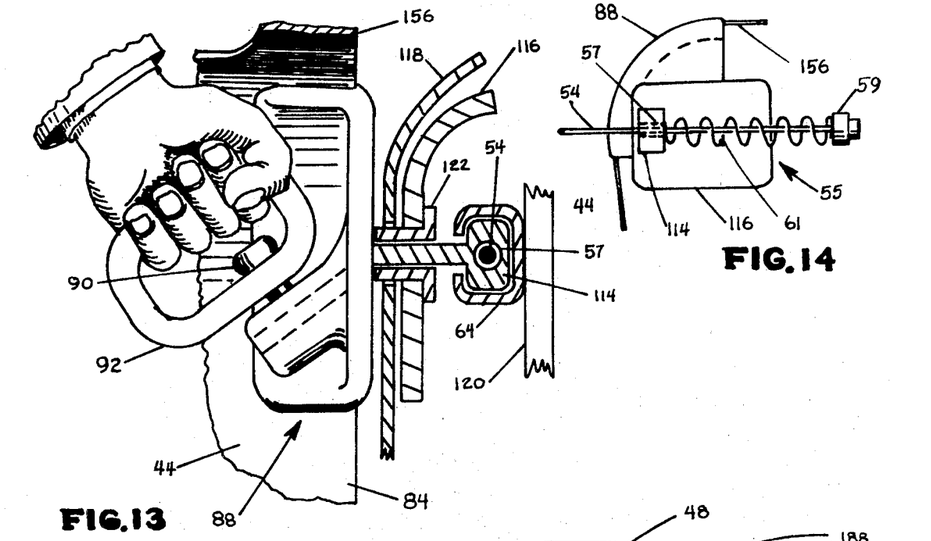
FIG. 13 is a fragmentary detailed view of the anchorage of the barrier element to the tension members embodying a quick release means, as viewed looking rearward from the driver's side.
FIG. 14 is a fragmentary enlarged right side elevational view of the end fitting assembly for the front right side as seen in FIG. 1.

The shock takeup assembly includes an elongated coiled spring 61 which is interposed between the upset end 59 of cable element 54 and the connecting pin 114, said cable being guided through the bushing 57 in said pin.

Figure 21:
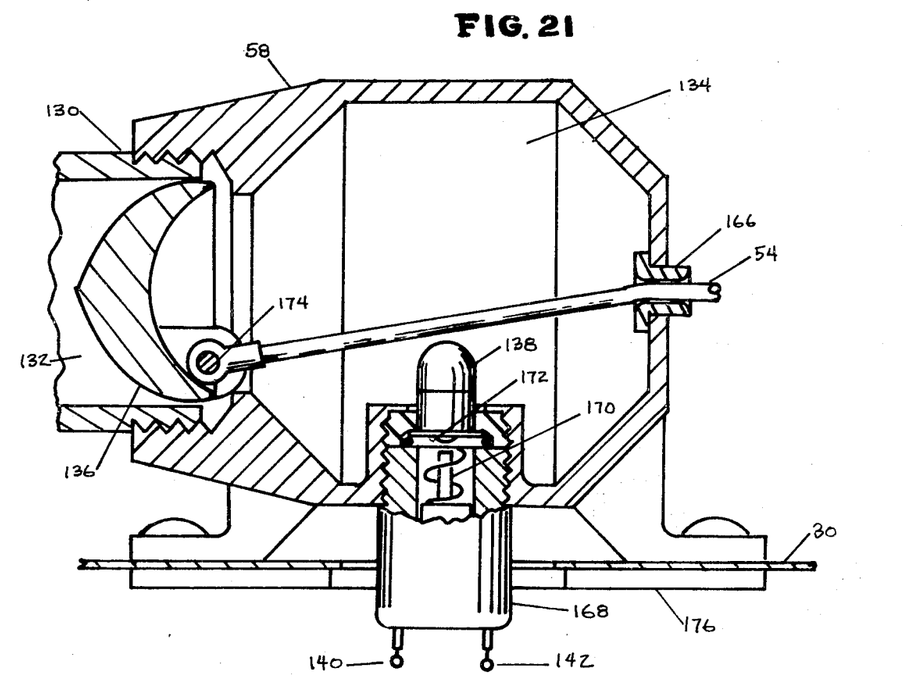
FIG. 21 is a schematic illustration of a representative explosive charge device to actuate the present restraint system.
Figure 22:
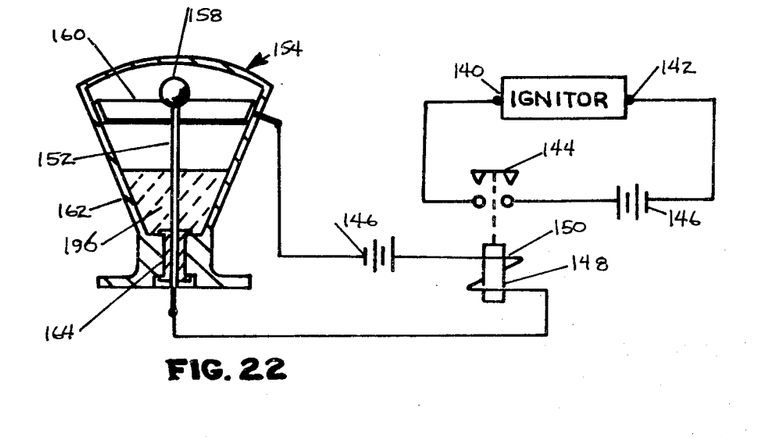
FIG. 22 is a schematic diagram of a representative crash sensor device which may be employed in the present restraint system to trigger the explosive charge device of FIG. 21.

Schematically illustrated in FIG. 21 is an exemplary actuator device to actuate the high tension actuator pull cables 54, 56 and 62 and which is triggered by an impact sensing device, exemplarily illustrated in FIG. 22.

The exemplary actuator device 58, shown in cross section in FIG. 21, includes an elongated barrel 130 which has an opening 132 at one end at the forward end is provided with an enlarged volume compression chamber 134. The respective cable, herein illustrated as the upper pull cable 54, extends into the front end chamber 134 for attachment to the rear end of a high speed projectile 136 normally retained in the forward end of the barrel 130 adjacent the compression chamber 134. The high speed projectile 136 may be of a bullet shaped configuration supported within the barrel 130 such that its outer radial surface forms a seal for the barrel against the chamber 134. The chamber 134 supports a suitable explosive charge 138 (for instance gun powder or gas or the like).

With additional reference to FIG. 21 the explosive charge 138 in chamber 134 of the actuator 58 is electrically connected by means of a conduit 140 to one pole of a normally open switch 144 and by a conduit 142 to a ground connection. The other pole of the switch 144 is electrically connected to a source of energy 146, such as the battery of the vehicle. The movable switch arm of the switch 144 is connected to the movable core 148 of transformer winding 150 which is electrically connected by a conduit to the conductor element 152 of an impact sensing device 154 rigidly mounted to the body of the vehicle at a designated location.

The impact sensing device 154 is a simple detector of the damped calibrated bob weight type whose spring conductor 152 is designed such as to yield in bending to a deflection which is a function of the vehicle acceleration vs. time characteristics for the first 10 milliseconds after bumper contact and at 30 m.p.h. barrier impact. A viscous fluid (196) is provided to dampout short time transient shocks. The detector 154, of course, is suitably tuned to the vehicle and to the location within the vehicle to obtain maximum effective and instant actuation of the actuator 58.

Referring again to FIG. 21, the end of the cable 54 extending through bushing 166 is shown attached to the projectile 136 at an eccentric location 174, offset from the center of explosive pressure to thereby provide a sprag type lock effect of the projectile at the end of the deployment stroke by which a force on the cable 54 in the release direction tends to wedge the projectile 136 within the barrel 130 to thereby prevent movement of the cable 54 in the release direction. Obviously, a one-way clutch assembly acting on the cable between the actuator and end fittings can be employed in lieu of the sprag action.

Obviously, the actuator and impact sensing device illustrated in FIGS. 21 and 22, for example, are to be considered illustrative only once various other known linear or rotatable actuator means and impact sensing means may be employed to effect the same purpose. Also, it is obvious to those skilled in the art that a compressed spring could be tripped to release on acceleration on the tensile harness.

Figure 15:
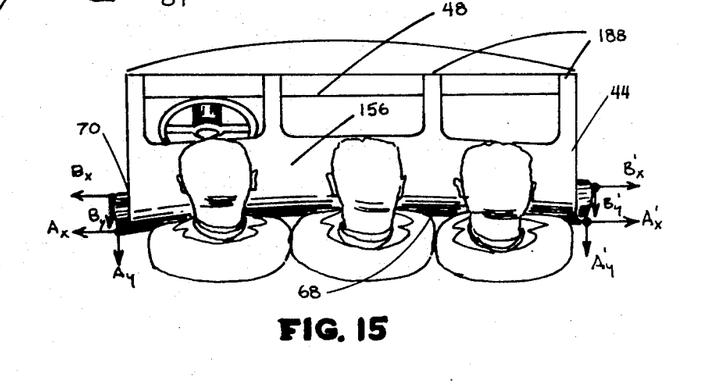
FIG. 15 is a schematic illustration in plan view of a typical occupant arrangement in a passenger vehicle indicating the force vectors involved under operating conditions of the present restraint system.

The resultant vector forces of the present improved restraint system are diagrammatically illustrated in FIG. 15 which shows the restraint net 44 being deployed against the torso of three occupants seated in the seat of the vehicle. The cylindrical high strength upper and lower chest and lap zones 68 and 70 of the restraint net 44 are indicated by the heavy lines connecting the opposite anchors A and A' and B and B' respectively.

Anchor points A and B at one side of the net 44 are connected by the high strength vertical tension zone 84, FIG. 13 and anchor points A' and B' at the other side of the net are connected by the high strength tension zone 86 FIG. 4, which retains the net in the deployed position.

To substantially calculate the required strength for the pull cables and the two main restraint zones of the restraint net the resultant deceleration is assumed to be 40 "G" and the weight of each occupant of the seat is calculated at 200 lbs. with a load distribution of 100 lbs. at the upper torso requiring a restraining force of 4,000 lbs. for each of the three upper torsos of the occupants of the seat. Thus, the designed restraining strength of the pull cables and main restraint zones can be derived at as follows: 12,000 × cos 45°=8,400 lbs.

Thus, the cables and restraint zones must be designed to withstand a load approximately 8,400 lbs. The 45° angle is an estimated catenary resultant in a typical installation.

FIGS. 23-26 illustrate schematically stages in the deployment function of the present improved occupant restraint system.

Figure 23:
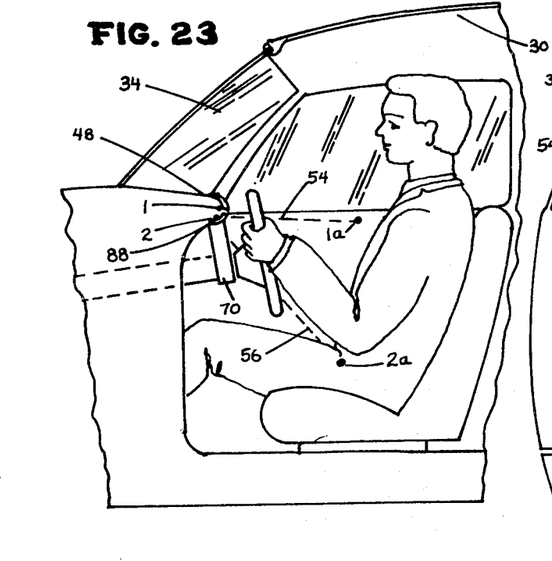
FIGS. 23 and 24 are schematic illustrations of the driver's compartment of the vehicle illustrating a precrash position.
Figure 24:
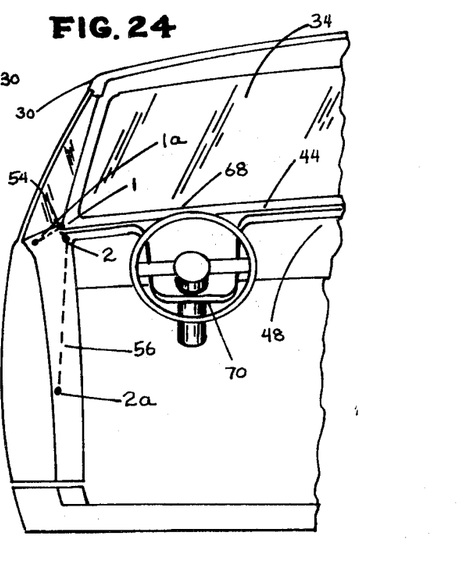

FIGS. 23 and 24 illustrate the preimpact position of the system showing the occupant (driver) being normally seated in the front seat of the vehicle 30 and the deploy net 44 being stowed in inactive position within the dashboard structure of the vehicle with the lower band 70 being disposed around the steering column to provide a window 74 in the net structure. Points 1 and 2 indicate the respective upper and lower cable anchorage points for the net 44 (defined by the end fittings 50 and 52 perspectively in FIG. 1) and the points 1a and 2a indicate the deployed position of the points 1 and 2 as disposed by the respective high tension pull cables 54 and 56 guided along a prescribed path as previously described.

Figure 25:
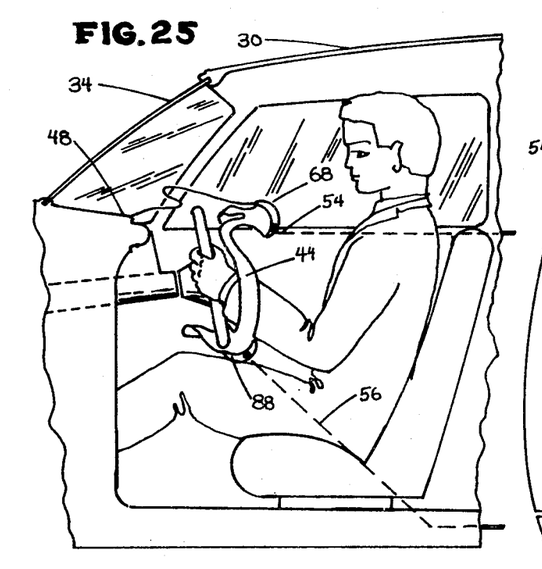
FIGS. 25 and 26 are views similar to FIGS. 23 and 24 illustrating the position immediately after impact.
Figure 26:
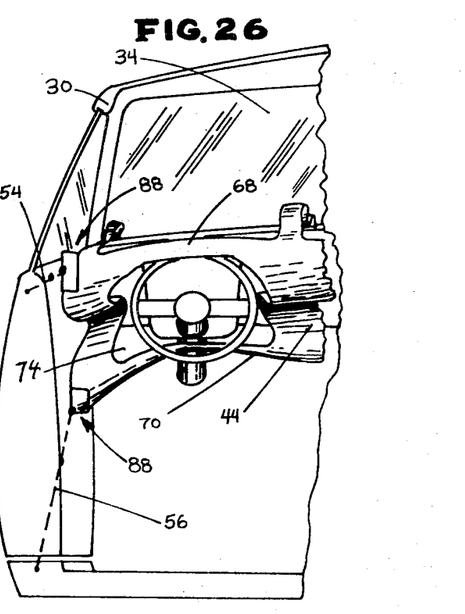

FIGS. 25 and 26 illustrate an initial actuated position of the present improved restraint system immediately after an impact, causing a sudden deceleration of the vehicle 30. The position of the system is shown at approximately 0.025 seconds after impact, the actuator 58 (FIG. 1) having been triggered to rapidly pull the actuator cables 54 and 56 rearwardly to deploy the net 44 towards the driver of the vehicle. In this initial position it will be noted that the upper high strength zone 68 of the net 44, which is shown gradually unfolding, is pulled in the direction towards the chest and the lower high strength zone or band 70 of the net is pulled in a direction slightly downwardly and rearwardly towards the lap section of the occupant. It will also be noted that the open portion 74 of the net 44 is in the state of being unfolded to extend over the steering wheel and the arms of the driver, in a manner much like a button-to-button hole function, permitting the driver to retain control of the vehicle.

As will further be noted the lower arm portions of the driver of the vehicle, which grab the steering wheel remain fully extended through the fully open window 74 provided in the intermediate portion 72 of the net-barrier.

With reference to FIGS. 2, 3 and 15 the position of the system and of the occupant of the vehicle, is schematically illustrated after impact. The driver of vehicle, or rather the upper body portion thereof has moved forwardly in the seat from the position at 0.040 seconds after impact shown in FIG. 15, at which point the restraint net 44 was deployed to its maximum extension rearwardly. The upper shoulder or chest portion of the occupant now abuts against the upper, maximum strength, curved chest zone 68, which positively restrains further forward movement of the upper torso of the occupant due to the rearwardly directed restraining force on the pull cables 54, indicated by the dashed line. Similarly, the lower, maximum strength, curved lap zone 70 of the net is now firmly deployed against the hip portion of the occupant by means of the lower pull cable 56, which exerts a rearwardly directed force at a magnitude sufficient to positively retain the occupant downwardly in the seat to thereby prevent an upward propelling of the occupant often encountered if no safety device is employed.

To restrain the head of the occupant from excessive pivotal movement forwardly, due to the sudden impact, an additional head antirotation membrane 156, such as indicated in FIGS. 1, 2, 4 and 15 may be employed, which is suitably secured to the upper high strength chest zone or band 68 and at a fixed line along the dashboard of the vehicle to expand into position with the extension of the net 44. Typically, this membrane 156 is a continuation of the fabric barrier 44.

The present improved, automatically deployed occupant restraint system features several distinct advantages over other known nondependent, occupant restraint systems among which are:

1. the restraint system concept locates the explosive release of energy for actuation outside of the passenger compartment, so there is no noise, shock wave, heat, toxic gas, pressure or the like imposed upon the occupant;
2. the present improved restraint system concept does not preclude continuous driver control and vision;
3. with the present improved restraint system concept there is no unavoidable relationship between the deploying force and the restraining force. Consequently, the deployment energy can be limited to achieve a trade off that will accept a partial stroke deployment, such as when the system contacts a standing child and preventing "launching" of the child back over the seat;
4. the present improved restraint system concept features a controlled, well defined deployment stroke which directs deceleration forces to zones of the occupants body that can sustain relatively large forces, such as the upper torso of the body and the lower thigh and pelvic body portions;
5. since the improved restraint system features a positive vehicle-to-occupant interface, the deceleration forces are responsive and do not depend upon a pressure buildup to obtain adequate occupant decelerating forces. Thus, the occupants are "in-phase" with the vehicle sooner and thereby conserve the critical "distance available factor" needed for high energy impacts;
6. the present restraint system, features a nonspringlike occupant barrier that does not require sophisticated force dissipation details, to avoid occupant rebound;
7. the present restraint system affords protection against side impacts, rollover and combination multiple events accidents;
8. the net or barrier coverage of the present restraint system, extends to the extremities of the passenger compartment and is virtually independent of precrash seating arrangements and the size, shapes and numbers of occupants;

9. the present improved restraint system is not merely a transient capability, and inasmuch as the consequences of premature deployment are not tragic, a less critical definition of the impact can trigger the deployment. This factor allows a less sophisticated and less costly impact detector to be used. Likewise, it is intended that the restraint net be repacked and the actuator be recharged after deployment to be reused;

10. inasmuch as the present restraint system decelerating force is via a stable "outboard" pull mechanism, rather than an "inboard" point source push foundation structure does not need to be added. This is particularly significant in other than front seat accommodations where there is no instrument panel or dashboard;

11. the deployment energy source to be utilized in the present improved restraint system, is a safe chemical compound for which no new technological breakthrough is required. Until the explosive charge is inserted into the actuator, the restraint system is completely inert, and after insertion of the charge neither impact, heat nor stray current will be able to detonate the energy source;

12. as a general advantage, the present improved restraint system is unsophisticated and composed of only a few simple, straight forward components. It does not require any great changes in vehicle design to accommodate incorporation of the system and, in fact, it permits elimination of an energy absorbing steering column.

Although the present invention has been described by means of a preferred embodiment, it will be obvious that various changes in arrangement and structural detail may be made by a person skilled in the art to which the invention pertains without departing from the spirit and essential characteristic thereof, therefore, the present embodiments are to be considered in all respects as illustrative only and not restrictive, the scope of the invention being indicated by the appended claims rather than by the foregoing description.

I claim:

1. In combination with a vehicle adapted to carry passengers seated on a seat extending across the interior of the vehicle; a normally concealed automatically deployable safety device adapted for instant extension into restraining contact with all occupants on said seat under sudden impact conditions of said vehicle comprising: an expandable and extendable restraint member disposed in front of said seat across said vehicle from side to side; said restraint member having reinforced upper and lower margins and reinforced side margins; said restraint member further normally being stored in a portion of the vehicle interior structure and adapted when extended to abut against the upper and lower torso of an occupant's body from substantially the chest portion down towards the lower thigh and pelvic portion with a magnitude of force sufficient to restrain said occupant from excessive movement off said seat in response to the sudden impact condition of said vehicle; said restraint member having guiding means secured to the upper and lower corners of the side margins for guiding support of said restraint member on the inner sides of said vehicle body along a predetermined path into restraining engagement with said occupant; and automatic actuator means connected to said guiding means and operable to substantially instantly cause deployment of said restraint member within 0.050 seconds after initial occurrence of said impact conditions.

2. In the combination as defined in claim 1, said actuator means comprising a plurality of pull members attached to said guide means for extension along said vehicle body internally of said vehicle and towards the rear of said vehicle; a pair of power actuators disposed in the rear of said vehicle each of which including a high speed longitudinally movable member adapted for connection to said pull members.

3. In the combination as defined in claim 2, each of said power actuators comprising an expansion chamber and a compression chamber; said longitudinally movable member attached to said pull members being disposed in said expansion chamber; explosive means disposed in said compression chamber and means to automatically ignite said explosive means at the instant of occurrence of said impact conditions to create an expansion force within said compression chamber to cause said high speed longitudinally movable member within said longitudinal expansion chamber to be propelled in a direction rearwardly of said vehicle to thereby deploy said restraint member from its stored position against the bodies of said occupants by means of said pull members.

4. In the combination as defined in claim 3, said means to ignite said explosive member within said compression chamber comprising an electric impact sensor connected to the body of said vehicle; and electrical circuit means including a normally open switch connected between said impact sensor and said explosive means and to a source of electrical current carried by said vehicle so that upon closure of said switch by actuation of said impact sensor said explosive means will be ignited.

5. In the combination as defined in claim 2, said pull members having located at a position corresponding to the door openings, latch side, and automatically engaging hook and eye assembly, that allows normal operation of the doors, but when the tensile member is accelerated, it reliably closes the hook and eye to provide a valid tensile path between the end fittings and actuators.

6. In the combination as defined in claim 2, said pull members having located at a position corresponding to the door openings, hinge side, a spring biased connector between the pull member and the poised end fitting to urge the pull member taught through a bushing in the end fitting, to accommodate normal door swing, said connector providing a shock absorbing function during initial deployment of said restraint member.

7. In the combination as defined in claim 2, said guiding means including:
   elongated arcuate reinforcements at the upper and lower sides of said restraint member at its opposite ends;
   each reinforcement including a pair of inturned flanges;
   a transverse pin interposed between said flanges and extending laterally outward thereof;
   a manually removable hitch pin extending through said flanges and first pin at one end thereof;
   elongated guide means on the vehicle structure;
   the outer end of said pin being guidably nested in said guide means and connected to said pull members.

8. In the combination of claim 7, an enlarged forced distribution plate mounted on each pin interposed between the trim panel and vehicle structure whereby upon receipt of a lateral secondary impact to the vehicle, the respective opposed pairs of force distribution plates are adapted to operatively engage the adjacent trim panel and, thus in turn, uniformly distribute deceleration forces upon the occupant or occupants.

9. In the combination as defined in claim 2, in which said pull members are arranged in cooperating coacting relationship with said guide means to exert a pair of forces on said restraint members outwardly to the sides of said occupants of said seat to pull said occupants rearwardly and downwardly onto said seat.

10. In the combination as defined in claim 1, said restraint member being a net like structure comprised of interwoven high-strength tensile fibers having a horizontal upper and spaced lower high-strength zone connected by an intermediate flexible membrane portion; and lateral sides comprised of high tensile members to provide a substantially, nonresilient net structure across the midbody portion of said occupants when said restraint member is in deployed position.

11. In the combination as defined in claim 10, said horizontal upper and lower high-strength zones being shaped to curve in transverse cross section away from the bodies of said occupants to thereby provide maximum occupant reaction force distribution across those portions of said bodies of said occupants most able to sustain the relatively high reaction forces against said restraint member.

12. In the combination as defined in claim 11, said horizontal upper high-strength zone comprising a plurality of longitudinal strong inelastic fibers adapted for nonresilient abutment against the upper chest portion of said occupants to pull said occupants backwardly into said seat.

13. In the combination as defined in claim 11, said horizontal lower high-strength zone being comprised of a plurality of strong inelastic fibers adapted when deployed in position for abutment against said lower thigh and pelvic portions of said occupants to move said occupants downwardly onto said seat to thereby counteract effects of rollover and side impact forces.

14. In the combination as defined in claim 10, said high-strength zone being composed of low yield woven fabric, secured to structural end fittings to focus the elemental tensile loads into a hardware path to which the automatic actuator means is releasably secured.

15. In the combination of claim 14, a force distributing padding covering said structural end fittings to minimize the effect of contact of these hardware fittings against parts of the occupant.

16. In the combination as defined in claim 10, in which said membrane portion of said restraining member is provided at one side with an opening for extension of the steering column of said vehicle therethrough when in folded position and for subsequent extension of said restraint member over the steering wheel and the lower arm portions of the driver occupant of said vehicle when said restraint member is deployed, to thereby enable said driver occupant of said vehicle to maintain control of said vehicle.

17. In the combination as defined in claim 1, said seat defining a front seat of said vehicle and said restraint member being normally concealed in folded condition along the dashboard of said vehicle.

18. In the combination as defined in claim 1, said seat defining a rear compartment seat of said vehicle and said restraint member being normally concealed in the back structure of the front seat of said vehicle.

19. In the combination as defined in claim 18, the lower horizontal margin of said restraint member being permanently anchored to a stationary portion of said vehicle forwardly of said occupants.

20. An automatically deployable occupant restraint system for use in a vehicle having at least one compartment containing a seat for accommodation of at least one occupant; said restraint system comprising a deployable member normally concealed in a stored condition within said vehicle interior structure in front of said occupant and normally unattached to said occupant; said deployable member comprising a barrier like structure extending across said seat from side-to-side and composed of high-strength tensile members arranged to provide an upper horizontal high-strength zone for restraining engagement against the upper torso portion of said occupant; opposite reinforced side margins each comprising a high-strength tensile member interconnecting opposite ends of said upper and lower high-strength zones and a relatively flexible membrane portion disposed between said upper and lower high-strength zones and said side margins to permit foldable storage of said deployable member when in the inactive position; said deployable member when deployed providing a substantially rigid restraining barrier across the midtorso portions and the sides of said occupant and; means to automatically deploy said deployable member at the instant of sudden deceleration of said vehicle with a force in which the deploying force and the restraining force capacity are mutually independent of each other so as to limit the deployment stroke when encountering an inertia mass reaction created by the respective position of said occupant relative to said deployable member.

21. In the restraint system as defined in claim 20, said upper and lower high-strength zones being shaped partly cylindrical in lengthwise direction of said barrier to assure distribution of restraint forces against portions of the body of said occupant which extend beyond the barrier boundaries.

22. In the restraint system as defined in claim 21, the further provision of an additional barrier element extending lengthwise of said barrierlike structure from said upper high-strength zone forwardly to an anchorage in said vehicle body to limit forward rotation of parts of the body of the occupant above the high-strength zone.

23. In the restraint system as defined in claim 20, said high-strength tensile member forming said barrier structure comprising low yield nonresilient elements oriented vertically and horizontally; said nonresilient elements preventing energy storage to thereby avoid rebound of said occupant from said barrier structure.

24. In the restraint system as defined in claim 20, tension pull members secured to the upper and lower corner portions of said barrierlike structure, said tension pull members being retractable along a predetermined deployment path in a direction laterally outwardly from and towards the rear of said occupant; actuator means disposed in said vehicle including a movable member for connection to the other end of said tension pull members; and sensor means to trigger said actuator means to thereby cause said movable member to pull said tension pull members along said predetermined deployment path for engagement of said upper high-strength zone against the upper torso body portion of said occupant to move said occupant rearwardly against the back of said seat and for engagement of said lower high-strength zone against the lower torso portion of said occupant to move said occupant back into said seat.

25. A safety system for occupants of a vehicle having a frame, said vehicle comprising compartments in which each compartment contains a seat for accommodation of said occupants;

said safety system comprising a blanket type restraint element of substantially rectangular shape extending across said seat from side to side in each seating compartment normally retracted in a stored position within said vehicle interior structure in front of said occupants;
said restraint element having reinforced corners;
tension members attached to said reinforced corners for transfer of the occupant's dynamic loads when said blanket restraint element is deployed;
actuator devices secured to said frame and operably connected to said tension members for rapidly deploying said blanket type restraint element from a stored position into a functional position against the torso of the bodies of said occupants to retain said occupants in said seats and;
electrically operable impact sensing devices attached to said vehicle operably connected to said actuator devices to cause operation of said actuator devices at the instant of a predetermined impact load on said vehicle.

\* \* \* \* \*